UNITED STATES PATENT OFFICE.

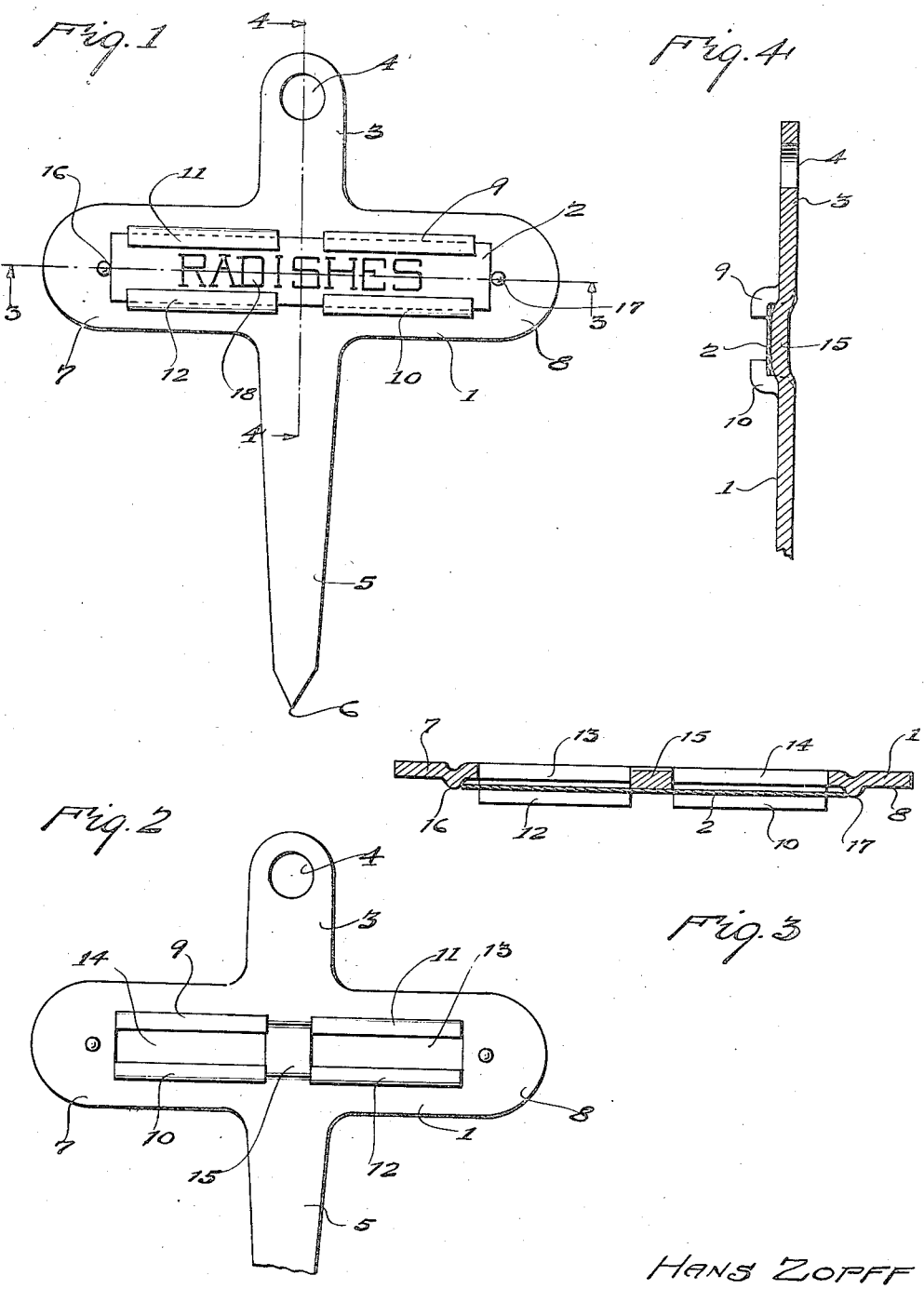

HANS ZOPFF, OF MONROE, MICHIGAN.

PLANT MARKER.

1,407,507.

Specification of Letters Patent. Patented Feb. 21, 1922.

Application filed October 30, 1920. Serial No. 420,697.

*To all whom it may concern:*

Be it known that I, HANS ZOPFF, a citizen of Germany, residing at Monroe, in the county of Monroe and State of Michigan, have invented new and useful Improvements in Plant Markers, of which the following is a specification.

This invention relates to plant markers and an object of the invention is to provide a plant marker which is constructed of a minimum number of parts, as well as one which is preferably stamped from sheet metal so as to provide a marker which will not be materially affected by weather conditions.

Another object of the invention is to provide a plant marker which embodies a name plate carrying member having a supporting stake formed thereon and provided with name plate guiding and retaining flanges as well as a centrally disposed rib which is slightly struck outwardly to bend the name plate sufficiently to cause firm binding engagement of the name plate against its guides and also to strike out from the carrying body, obstructions for engaging the ends of the name plate to prevent longitudinal movement thereof relative to the carrying body.

Other objects of the invention will appear in the following detailed description taken in connection with the accompanying drawings wherein:

Fig. 1 is a face view of the improved plant marker.

Fig. 2 is a rear view of the plant marker.

Fig. 3 is a horizontal section taken on line 3—3 of Fig. 1.

Fig. 4 is a vertical fragmentary section taken on the line 4—4 of Fig. 1.

Referring more particularly to the drawing the improved plant marker comprises the carrying body 1, and the name plate 2, which is detachably carried by the carrying body 1. The carrying body 1 is cast in one piece, or preferably stamped from sheet metal substantially in cross shape, providing a head 3 which is perforated at 4 to permit the marker to be attached by means of a wire, string, or the like, to tag nursery trees or the like if it is so desired. The stake 5 of the body gradually tapers towards its center as it extends downwardly and it has its lower end pointed as shown at 6 to facilitate its insertion into the ground when the marker is used in designating varieties of seeds planted in certain beds. The cross arms 7 and 8 of the body 1 have guides 9, 10, 11 and 12 struck therefrom providing openings 13 and 14. The guides are arranged in upper and lower sets, and have their facing ends spaced, as clearly shown in Figs. 1 and 2 of the drawings providing a centrally disposed bracing rib 15. The bracing rib 15 is slightly struck forwardly, as clearly shown in Figs. 3 and 4 of the drawing, for forcing the name plate 2 firm against the guides 9, 10, 11 and 12 to prevent accidental movement of the name plate relative to the carrying body. Bosses 16 and 17 are struck forwardly from the cross arms 7 and 8, and are positioned to be engaged by the ends of the name plate 2 to prevent longitudinal movement of the name plate. The name plate 2 is preferably struck from resilient or spring sheet metal so as to permit it to be sprung sufficiently to permit its proper sliding in position relative to the carrying body 1. The indicia indicated at 18 may be either printed upon or cut from the name plate 2 as desired without departing from the spirit of this invention.

By making the entire plant marker of metal it may be "Parkerized" or chemically treated to render it rust proof so that it can be used a number of seasons and also by making the marker of metal a marker is provided which will not be mutilated so as to render its indicia unintelligible by weather conditions.

From the foregoing description taken in connection with the accompanying drawings it will be apparent that a durable and efficient plant marker has been provided which can be stamped from sheet metal at a relatively low cost of manufacture; it comprising merely two pieces, i. e., a name carrying body and a name plate.

It is, of course, to be understood that the invention may be constructed in various other manners and the parts associated in other relations and, therefore, I do not desire to be limited in any manner except as set forth in the claim hereunto appended.

Having thus described my invention what I claim is:

A device of the class described comprising a relatively flat body formed from a single piece of material and including a stake, cross arms extending at right angles from opposite ends of said stake and provided with elongated openings, a head extending from the opposite end of said stake and provided with an enlarged opening, a name plate bearing suitable indicia engaging said stake, a plurality of guides extending from opposite edges of said opening and engaging said plate, and bodies struck forwardly from said cross arms adjacent to the ends of said plate.

In testimony whereof I affix my signature.

HANS ZOPFF.